United States Patent Office 3,819,679
Patented June 25, 1974

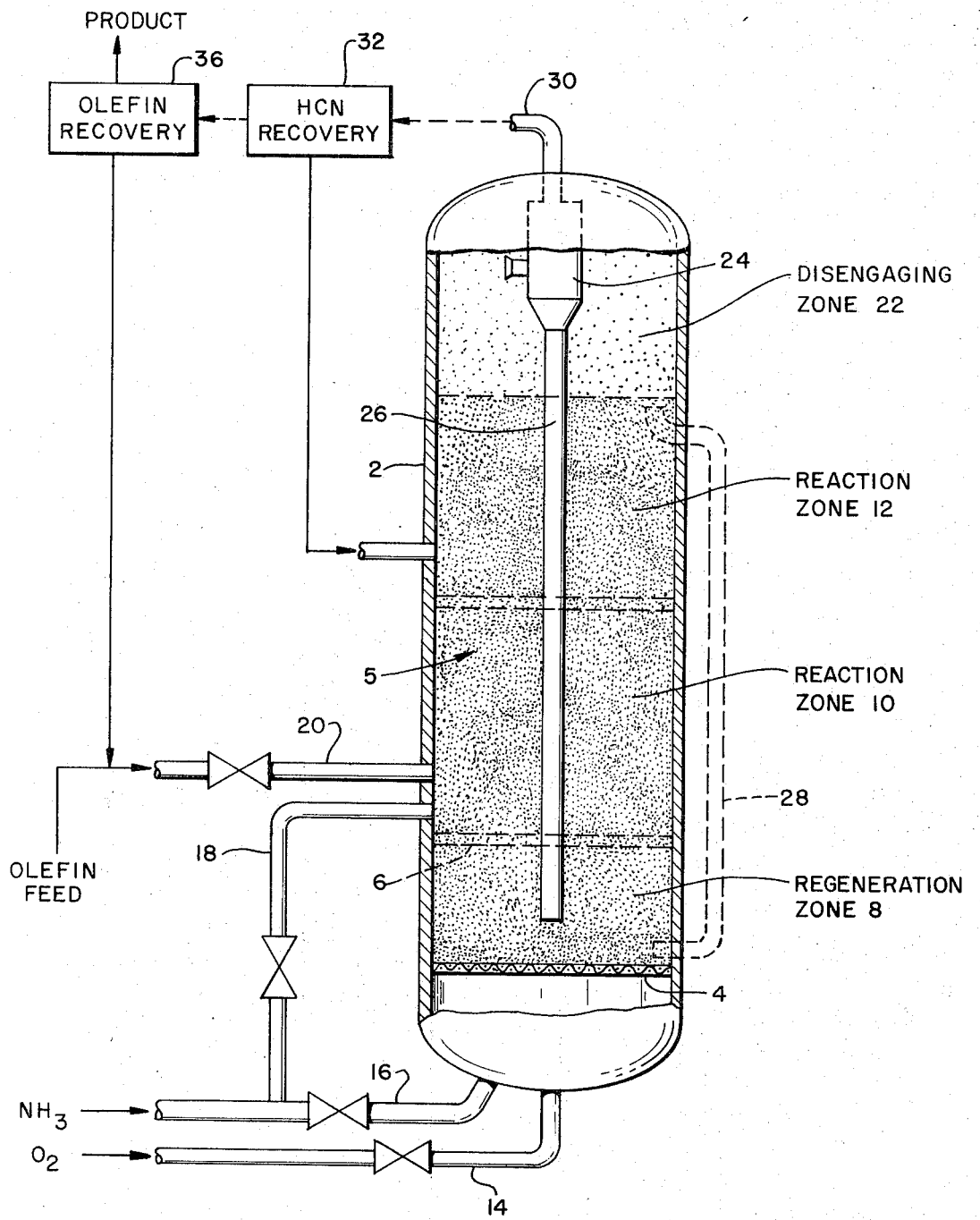

3,819,679
MANUFACTURE OF UNSATURATED NITRILES
Harold R. Sheely, Newton, Mass., assignor to The
Badger Company, Inc., Cambridge, Mass.
Filed Oct. 20, 1971, Ser. No. 191,005
Int. Cl. C07c 121/02, 121/32
U.S. Cl. 260—465.3                    7 Claims

ABSTRACT OF THE DISCLOSURE

An improved method of producing unsaturated nitriles by reaction of an olefin with ammonia and oxygen in a reactor having a fluidized catalyst bed, whereby the amount of ammonia introduced as feed and present in the reaction effluent is minimized. The olefin is reacted with the ammonia and oxygen at one level in the reactor, and hydrogen cyanide by-product which is recovered from the reaction effluent is recycled to the reactor at a level in the fluidized bed above the level at which the ammonia and olefin are reacted.

---

This invention relates to the oxidation of olefin-ammonia mixtures to unsaturated nitriles such as acrylonitrile and methacrylonitrile, and more particularly to an improvement in the manufacture of an unsaturated nitrile by a process which involves the catalytic vapor phase reaction of oxygen, ammonia, and an olefin in a reactor containing a fluidized catalyst.

Many processes are known in the art which deal with the manufacture of unsaturated nitriles by the catalytic oxidation of olefins and ammonia. For example, U.S. Pat. 2,904,580 discloses reacting a mixture of propylene, oxygen and ammonia in vapor phase at an elevated temperature in the presence of a catalyst to obtain acrylonitrile in good yields. However, a byproduct of such process is hydrogen cyanide. The amount of hydrogen cyanide produced is not large enough in comparison to the amount of the acrylonitrile produced to warrant the installation of facilities for its recovery, and while it may be readily disposed of by burning, this is not economical from a commercial standpoint.

With respect to solving this problem, U.S. Pat. 3,050,546 discloses that it is possible to suppress formation of hydrogen cyanide as a by-product of such a reaction by recovering it from the reaction effluent, and recycling it to the reactor. While this scheme minimizes the production of hydrogen cyanide by-product, the reaction effluent still contains a substantial amount of ammonia. The latter constitutes another disposal problem. Typically the ammonia is separated from the reaction effluent by acid neutralization and then the resulting salt, typically ammonia sulfate, is discarded or sold. However, such salt has a relatively low sales value compared with the initial cost of ammonia, and therefore, such process is also unattractive from a commercial standpoint.

With respect to solving this latter problem, U.S. Pat. 3,578,695 discloses a further modification by which ammonia is eliminated entirely, and hydrogen cyanide is used to produce the desired nitrile by reaction with an olefin and molecular oxygen in the presence of a fluidized catalyst at an elevated temperature. However, this modification presents another problem—namely, the requirement of a source of hydrogen cyanide. In the absence of an existing source of hydrogen cyanide, it is necessary to set up an auxiliary hydrogen cyanide plant. However, since such a plant also produces ammonia as a by-product, it reintroduces the ammonia disposal problem. Accordingly, the essential and primary object of the present invention is to improve on prior art processes for the production of unsaturated nitriles such as those described in U.S. Pats. 3,050,546 and 3,578,695 by providing a further modification which essentially eliminates both ammonia and hydrogen cyanide disposal problems.

In its broadest sense, the invention is an improved method of producing an unsaturated nitrile by the reaction of oxygen, ammonia and olefin in a fluid bed reactor, the method essentially comprising introducing a hydrogen cyanide by-product recycle stream into the fluidized catalyst bed at a point above which the ammonia and olefin are reacted. By this method it is possible to reduce the amount of ammonia feed to the reactor and almost fully eliminate the occurrence of ammonia in the reaction effluent.

Other objects and advantages and specific details of the invention are set forth or rendered obvious by the following detailed specification which is to be considered together with the associated drawing which schematically illustrates a preferred system for practicing the invention.

In the case where HCN is not introduced to the reactor, the incomplete useage of ammonia resulting in its presence in the reaction effluent is due in part to the fact that a small excess of ammonia is supplied to the reactor to assure an adequate yield of the desired nitrile product. An excess of ammonia is required to effect the reaction for the formation of nitrile because some of the ammonia burns to yield nitrogen and water. For example, the theoretical amount of ammonia required per mol of propylene is about 0.93 mol (when the amounts of acrylonitrile, acetonitrile and HCN produced from one mol of propylene are 0.6 mol, 0.08 mol and 0.07 mol respectively), but an excess of 10-20% ammonia is usually used, e.g. about 1.2 mols per mol of propylene (see U.S. Pats. 2,904,580 and 3,546,268). It has now been discovered that the continual presence of ammonia in the reaction effluent produced by reacting the olefin with oxygen, ammonia and recycle hydrogen cyanide is due to competition between the ammonia and hydrogen cyanide for reaction with the olefin. The olefin reacts with both of them and as a result a lesser percentage of the ammonia feed is consumed than is the case where no HCN is introduced to the reactor.

The present invention is based on the discovery that the aforesaid competition between the ammonia and hydrogen cyanide can be controlled and minimized with a consequent increase in percentage utilization of the ammonia feed and a reduction in the amount of ammonia required to be fed to the reactor. These results may be achieved in accordance with this invention by feeding the hydrogen cyanide to the reactor at a level above the point where the ammonia, olefin and oxygen are introduced and by decreasing the ammonia to olefin ratio to a value less than that normally required for the process. This results in a deficiency of ammonia in the vicinity where the ammonia and olefin are introduced, with a consequent useage of substantially 100 percent of the ammonia but incomplete useage of the olefin. The uncoverted olefin and unconsumed oxygen, together with the products of complete and incomplete olefin conversion, are then contacted with the hydrogen cyanide to produce additional nitrile product. In this way the invention improves over the prior art by (1) substantially eliminating the problems of disposing of ammonia and HCN and (2) eliminating the need for a separate source of HCN. Essentially the invention achieves results which persons skilled in the art have considered to be mutually exclusive.

As used herein the term "olefin" is meant open-chain as well as cyclic olefins, and among those which may be used in the practice of this invention are: propylene, butene-1, butene-2, methylisobutylene, pentene-1, pentene-2, 3-methylbutene-1, 2-methyl-butene-2, hexene-1, hexene-2, 4-methylpentene-1, 2,3-dimethylbutene-1, 4-methyl-pentene-2, octene-1, cyclopentene, cyclohexene, and 3-cyclohexene, as well as higher alkenes and homologs and analogs thereof and also mixtures of the same. The preferred reactants are mono-olefins having the structure

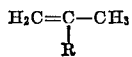

where R is a member selected from the group consisting of hydrogen or a methyl radical, the invention having particular application to the production of acrylonitrile and methacrylonitrile from propylene and isobutylene respectively.

Any source of molecular oxygen may be used. Preferably it is introduced in the form of air for economic reasons. The molar ratio of oxygen to olefin should be in the range of 0.5:1 to 5:1, and preferably between 1:1 to 3:1. For conversion of propylene and isobutylene, best results are achieved with a molar ratio of oxygen to olefin in the range of 1:1 to 2:1.

The molar ratio of ammonia to olefin may be between about 0.05:1 and about 1:1. This ratio results in about 95–100% useage of the ammonia. This differs from the current industrial practice which uses at least 10% and more often 15–25% excess ammonia above that required to maintain a stoichiometric ratio of 1:1 in order to avoid formation of oxygenated derivatives of the olefin (see U.S. Pats. 3,427,343 and 3,230,246). In the present invention formation of oxygenated derivatives of the olefin is minimized since such derivatives are converted to the corresponding olefinic nitrile by subsequent reaction with the recycle hydrogen cyanide.

The amount of HCN supplied to the reactor should be enough to provide a hydrogen cyanide to olefin ratio in the range of about 0.05:1 to about 0.5:1, depending upon the amount of ammonia that is used. In practice HCN recovered from the reaction effluent is well within this range; hence, all of the recovered HCN is recycled to the reactor and the amount of ammonia introduced as feed is adjusted within the limits set forth above according to the amount of available HCN, provided, however, that the combined total of ammonia and HCN is not less than 0.95 mol per mol of olefin. The presence of ammonia is required in order to assure that its reaction with the olefin will produce HCN for recovery and recycling as herein described. If the combined total of ammonia feed and recycle HCN is appreciably less than about 0.95 mol per mol of olefin, various amounts of oxygenated derivaties of the olefin will also be found and the yield of desired nitrile will be lowered.

As in prior art processes, water may be used in the reaction mixture (in amounts such as described in U.S. Pat. 3,427,343) to obtain well-known beneficial effects, but reactions not involving water are also to be considered within the scope of this invention.

Of course, inert diluents such as nitrogen and carbon dioxide may be present in the reaction mixture.

Any one of a plurality of well-known catalysts which will function to catalyze (1) the reaction of oxygen, ammonia and an unsaturated olefin and (2) the reaction of oxygen, hydrogen cyanide with the same olefin and oxygenated derivatives of the olefin, so as to produce an unsaturated nitrile, may be used to practice this invention. Preferably, and particularly in converting propylene and isobutylene to acrylonitrile and methacrylonitrile, respectively, the catalyst consists of the combined oxides of antimony and uranium prepared as described in Example I of U.S. Pat. 3,427,343. Other usable catalysts are the bismuth, tin, and antimony salts of phosphomolybdic acid and molybdic acid, bismuth silicomolybdate, bismuth silicophosphomolybdate, and bismuth phosphotungstate, as disclosed in U.S. Pats. 2,904,580, 2,941,007, 3,044,966, 3,050,546 and 3,546,268. Additional preferred catalysts useful in the invention are the combined oxides of antimony and iron, antimony and thorium, antimony and cerium, and antimony and manganese, as well as catalysts of the type disclosed in U.S. Pats. 3,248,340, 3,186,955, 3,200,081, 3,200,084, 3,264,225, 3,328,315, and 3,427,343. The catalysts may be formed as pellets or spheres in accordance with conventional techniques, with the particles consisting solely of the catalyst or of a silica or other support impregnated with the catalyst. Preferably, the catalyst particle size is in the order of 50 to 100 microns (i.e., 100 mesh or finer), but larger or smaller size particles may be used.

The process is conducted at those temperatures and pressures which are typical of processes for conversion of unsaturated olefins to unsaturated nitriles, the temperature and pressure requirements being determined by the reaction mixture and the desired product. For conversion of propylene and isobutylene, the temperature may be in the range of 500 to 1000° F., preferably 750–950° F., and the pressure should be at atmospheric or slightly higher, but no more than 3–5 atmospheres. Preferably the pressure is between 1–3 atmospheres.

The optimum contact time will, of course, vary with the olefin being treated. In general the contact time may be in the range of 0.1 to 50 seconds, preferably from 1 to 15 seconds.

While the process may be carried out on an intermittent basis, in practice it is carried out continuously for economic reasons. The reactor will accordingly comprise at least three catalyst-containing zones communicating with each other, the first-in-line being a catalyst regeneration zone and being equipped with means for introducing molecular oxygen and optionally ammonia (either separately or admixed); and the second and third being reaction zones, the second being equipped with means for introducing the olefin feed (and also ammonia if all of the ammonia is not introduced to the first-in-line zone), and the third being equipped with means for introducing the recycle hydrogen cyanide. Of course the reactor should comprise a catalyst-disengaging zone in which the catalyst is separated from the reactor effluent. Separation of catalyst fines from the effluent is achieved in known ways, e.g. by passing the effluent through cyclones or filters. Additionally, the system must comprise means for separating and recovering the hydrogen cyanide from the reactor effluent, and means for recycling the hydrogen cyanide to the third reaction zone. Such means may include, for example, a water quench column in which the effluent is cooled, an absorber column where the nitriles, together with HCN and any oxygenated derivatives of the olefin, are separated from off gases by absorption in a suitable solvent such as water, and an extractive distillation unit (where water, for example, is the extractive medium) for separating the hydrogen cyanide from the olefinic nitrile product. Regeneration of catalyst is achieved by continuously circulating catalyst from the reaction zones to the catalyst regeneration zone where regeneration is achieved by contacting the catalyst with oxygen.

Preferably the invention is practiced using a reactor in which the different catalyst containing zones are in a vertical relationship with the catalyst regeneration zone to which the oxygen and ammonia are introduced being at the bottom, followed in turn by dense phase fluidized bed reaction zones and the disengaging zone. If desired, the reaction zones may be subdivided into a plurality of chambers or compartments set apart by a series of spaced foraminous members or perforated trays which may, for example, be flat, conical, or pyramidal screens, gratings, or perforated plates (with the openings therein sized for optimum operation), according to the practice described in U.S. Pats. 3,230,246 and 2,427,343.

Preferably the invention will be practiced in accordance with the disclosure in my co-pending U.S. Application Ser. No. 39,592, filed May 22, 1970, whereby from about 3% to 9% and preferably 10% to 30% of the total ammonia feed will be delivered to the regeneration zone, with the remainder being introduced to the same reaction zone or zones as the olefin feed. This serves to minimize production of $CO_2$ and CO by oxidation of any olefin which may be present on recycled catalyst.

For better control of reaction temperature, it may be desirable to include heat exchanger coils or tubes within the reaction zone or zones.

Separation and recovery of nitriles, unreacted oxygen, and olefin and many oxygenated derivatives of the olefin may be effected by any of the several different methods known to those skilled in the art. Any unreacted olefin, oxygen and oxygenated derivatives of the olefin recovered from the effluent may be recycled to the reactor.

The invention will be better understood by reference to the drawing which illustrates schematically a preferred reactor apparatus for carrying out the improved process of the present invention. In the drawing a vertical reactor 2 contains at its bottom end a gaseous fluid distributor grid 4 having openings for through-flow of reactant gases and which functions as a support for a bed 5 of a selected catalyst. The reactor may also have perforated baffle plates 6 extending across its cross-section to facilitate establishing three discrete zones 8, 10, and 12 in the catalyst bed fluidized as described below. The baffle plates 6 allow controlled circulation of catalyst from one to the other of the three zones. Molecular oxygen, preferably in the form of air, is introduced to the bottom of the reactor by a line 14. Ammonia gas is introduced to the bottom of the reactor by a line 16 and to zone 10 via a line 18. Unsaturated olefin is introduced to zone 10 via a line 20. The oxygen and the ammonia feeds introduced via lines 14 and 16 pass upward through the grid 4 and the baffle 6 at a velocity sufficient to fluidize the catalyst solids within the zones 8, 10 and 12, i.e., sufficient to maintain the catalyst particles in a turbulent suspension. The fluid catalyst bed in the zone 12 is maintained at a selected height below the top of the reactor so as to provide a disengaging zone 22 in which the catalyst particles are disengaged from the reactor effluent. A cyclone separator 24 is provided in the disengaging zone to separate catalyst fines entrained in the reactor effluent. The cyclone separator is provided with a dip-leg 26 for returning the separated fines back to the catalyst bed. Preferably the dip-leg is long enough to return the catalyst fines to the catalyst regeneration zone 8. Alternatively, the dip-leg may be arranged to return the fines separated by the cyclone 24 to either or both of the zones 10 and 12. If desired, recirculation of catalyst to the regeneration zone 8 may be increased by providing a catalyst return pipe 28 which is arranged to return catalyst from reaction zone 12 (preferably near its top end as shown) down to the bottom of regeneration zone 8.

The effluent is removed from the reactor via a line 30. After removal of off gases, the reactor effluent is passed to an HCN recovery unit 32 where HCN is recovered and then delivered to an HCN feed line 34 whereby it is introduced into the reaction zone 12. From the HCN recovery unit 32 the effluent passes to an olefin recovery unit 36 where unreacted olefin is recovered and then returned to the reaction zone 10 via line 20. If desired, the product effluent recovered from recovery unit 36 may be further treated to recover oxygenated derivatives before being passed to storage, and these recovered oxygenated derivatives may be recycled to either or both of the reaction zones 10 and 12 for further reaction whereby to improve the overall yield of the desired nitrile product.

In the operation of the reactor, catalyst is continuously circulated through the several zones as above described, with the catalyst being continually regenerated in zone 8 by the molecular oxygen and olefin feed being continually converted to the desired nitrile product in the fluidized bed reaction zones 10 and 12. Any olefin which may be absorbed by the recycled catalyst particles is converted to the desired nitrile product in regeneration zone 8 by reaction with the ammonia and oxygen introduced via lines 14 and 16.

The gas velocities should permit a contact time in the range of 0.1 to 50 seconds in each of the zones 8, 10 and 12, and preferably a contact time of 1 to 15 seconds. As used herein the term "contact time" is defined as the length of time in seconds which a unit volume of gas measured under the conditions of reaction is in contact with the unit volume of catalyst.

The following examples illustrate how propylene and isobutylene may be converted to acrylonitrile and methacrylonitrile using the apparatus shown in the drawing containing a catalyst consisting of the combined oxides of antimony and uranium prepared as described in Example I of U.S. Pat. No. 3,427,343 and with an average particle size of about 100 microns.

EXAMPLE I

The propylene feed, oxygen in the form of air, and ammonia are introduced at rates providing a molar ratio of oxygen to propylene of 1.5 to 1 and a molar ratio of ammonia to propylene of about 0.95 to 1. About 10% of the total ammonia feed is delivered to the regeneration zone 8 and the remainder is delivered to the reaction zone 10. The reactions are carried out at a temperature of about 850° F. and a pressure of 20 p.s.i.g. The gas velocities are set so as to provide a contact time of about 5 seconds. Hydrogen cyanide by-product, recovered in an amount providing a molar ratio of hydrogen cyanide to propylene feed of about 0.05 to 1, is continuously recirculated to reaction zone 12.

EXAMPLE II

The isobutylene feed, oxygen in the form of air, and ammonia are introduced at rates providing a molar ratio of oxygen to isobutylene of 1.5 to 1 and a molar ratio of ammonia to isobutylene of about 0.95 to 1. About 15% of the total ammonia feed is delivered to the regeneration zone 8 and the remainder is delivered to the reaction zone 10. The reactions are carried out at a temperature of about 900° F. and a pressure of about 20 p.s.i.g. The gas velocities are set so as to provide a contact time of about 5 seconds. All of the HCN recovered from the reaction effluent is continuously recycled to reaction zone 12 of the reactor.

Effluent recovered from the reactor when operating according to the Examples I and II contain less than 5% ammonia prior to separation of HCN; furthermore, acrylonitrile and acetonitrile yields of at least 60% and no more than 7% respectively are possible when practicing according to the procedure of Example I. Similar yields are obtainable when converting isobutylene according to the procedure of Example II.

The benefits of this invention are also obtainable when other olefins of the type described above are subjected to ammoxidation using recycle HCN in the manner herein described.

Of course the invention may be practiced otherwise than as specifically described and illustrated. Thus the ammonia and air may be admixed prior to entering the bottom end of the reactor or the ammonia supplied to the regeneration zone may be introduced directly to that zone or at a point near to the distribution grid 4, in which case the oxygen feed also may be introduced immediately below the gird 4 so as to assure adequate mixing with the ammonia.

It also is contemplated that less than all of the HCN in the reaction effluent may be recycled to the reactor, with the remaining HCN either being disposed of in a suitable manner known to persons skilled in the art or retained in the effluent where its concentration is sufficiently low for it to be tolerated as an impurity in the final nitrile product. Addition of fresh HCN to the system to augment that recovered from the reactor effluent may be resorted to where desired or necessary.

The essential advantages derived from the practice of this invention comprise a reduction in the amount of olefin feed lost by conversion to by-products such as acrolein, acetaldehyde and acetone, the ability to achieve superior yield without having to resort to a plurality of serial reactors or reaction zones (although the invention permits the use of serial reactors or reaction zones if desired), ability to operate efficiently with molar ratios of ammonia to olefin below the stoichiometric ratio of 1:1 without an attendant increase in the quantity of by-product oxygenated olefin derivatives and, most importantly, elimination of the problem of disposal of ammonia and hydrogen cyanide.

What is claimed is:

1. A process for producing acrylonitrile or methacrylonitrile by the reaction of propylene or isobutylene with ammonia and oxygen in a reactor containing a fluidized bed of an ammoxidation catalyst by reacting said propylene or isobutylene, ammonia and oxygen in a first reaction zone maintained at a temperature in the range of about 500° F. to 1000° F. in said fluidized bed to form acrylonitrile or methacrylonitrile, respectively, and hydrogen cyanide by-product, passing the reaction products upwardly through said bed and recovering the reaction effluent from said reactor and separating therefrom hydrogen cyanide present therein, introducing sufficient ammonia to said reactor so as to provide total ammonia to total propylene or isobutylene molar ratio in the range of about 0.05:1 to about 1:1, and recycling sufficient separated hydrogen cyanide to a second reaction zone in said bed located downstream of said first reaction zone so as to provide a hydrogen cyanide to propylene or isobutylene molar ratio in the range of about 0.05:1 to about 0.5:1.

2. The process of claim 1 wherein said oxygen is supplied in the form of air.

3. The process of claim 1 wherein said bed is fluidized by said oxygen.

4. The process of claim 1 wherein the reactor also includes a catalyst regeneration zone located upstream of said first reaction zone, and further wherein catalyst is continuously recirculated from said reaction zones to said regeneration zone for regeneration by contact with molecular oxygen, at least part of the oxygen supplied to said reactor being introduced directly into said regeneration zone.

5. The process of claim 4 wherein 10–30% of the total amount of ammonia supplied to said reaction is introduced to said regeneration zone.

6. The process of claim 1 wherein additional hydrogen cyanide feed is introduced directly into said second reaction zone.

7. A process for producing acrylonitrile or methacrylonitrile by reaction of propylene or isobutylene with ammonia and oxygen in a reactor having a reaction area made up of a series of communicating zones each containing a fluidized ammoxidation catalyst, said process comprising introducing molecular oxygen and ammonia into the first-in-line of said zones, introducing said propylene or isobutylene and additional ammonia feed into at least one other of said zones downstream of said first-in-line zone so as to provide a total ammonia to total propylene or isobutylene molar ratio in the range of about 0.05:1 to about 1:1, maintaining the temperature in said reaction area between about 500° F. and 1000° F., passing the reactant vapors downstream of said first-in-line zone and forming acrylonitrile or methacrylonitrile, respectively, and hydrogen cyanide byproduct, recovering the products of reaction from said reaction area and separating therefrom hydrogen cyanide present in said products, and finally, recycling at least a part of said separated hydrogen cyanide to at least one another of said zones downstream of any said zone in which said ammonia is introduced so as to provide a hydrogen cyanide to propylene or isobutylene molar ratio in the range of about 0.05:1 to about 0.5:1.

References Cited
UNITED STATES PATENTS

| | | | |
|---|---|---|---|
| 3,050,546 | 8/1962 | Milberger | 260—465.3 |
| 3,230,246 | 1/1966 | Callahan et al. | 260—465.3 |
| 3,546,268 | 12/1970 | Ikeda et al. | 260—465.3 |
| 3,472,892 | 10/1969 | Callahan et al. | 260—465.3 |
| 3,639,103 | 2/1972 | Sheely | 260—465.3 X |

JOSEPH PAUL BRUST, Primary Examiner

U.S. Cl. X.R.

260—464